June 10, 1969  G. D. LONG  3,449,671
OSCILLOGRAPHIC APPARATUS FOR MEASURING THE MAGNITUDE
AND DURATION OF INPUT WAVEFORMS
Filed Feb. 18, 1966
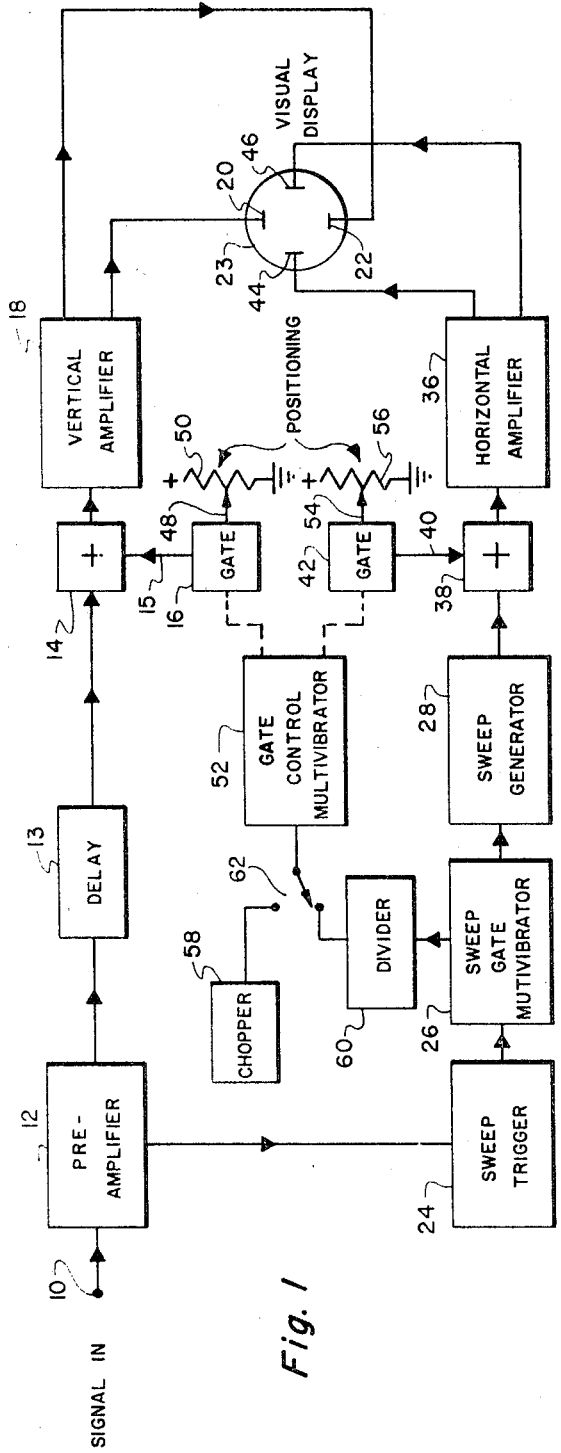
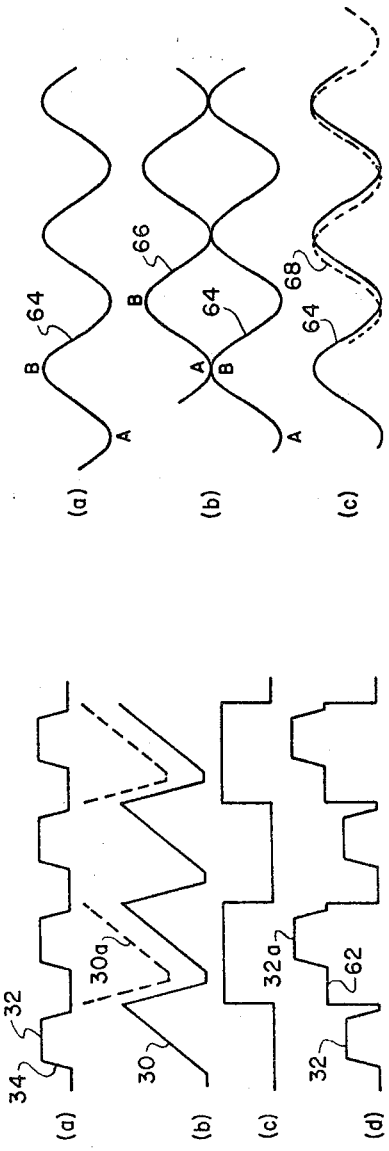
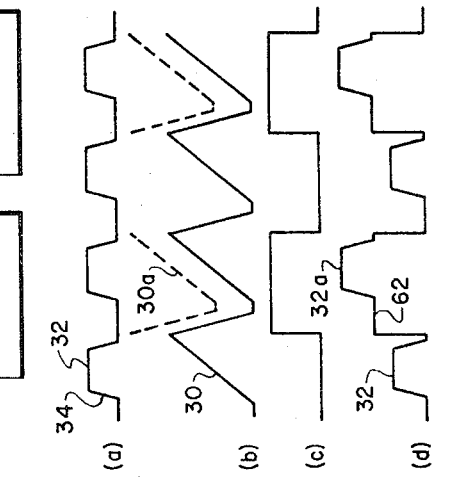
GORDON D. LONG
INVENTOR
BY
BUCKHORN, BLORE, KLARQUIST & SPARKMAN
ATTORNEYS

United States Patent Office 3,449,671
Patented June 10, 1969

3,449,671
OSCILLOGRAPHIC APPARATUS FOR MEASURING THE MAGNITUDE AND DURATION OF INPUT WAVEFORMS
Gordon D. Long, Beaverton, Oreg., assignor to Tektronix, Inc., Beaverton, Oreg., a corporation of Oregon
Filed Feb. 18, 1966, Ser. No. 528,625
Int. Cl. G01r 13/20
U.S. Cl. 324—121          8 Claims

ABSTRACT OF THE DISCLOSURE

An oscilloscope includes means for intermittently adding electrical values to the horizontal and vertical deflection signals thereby producing first and second displays of an input waveform. The electrical values are adjustable for convenient juxtaposition of selectable portions of the displays for measuring dimensional parameters of the waveform.

---

This invention relates to a calibrated oscillographic apparatus and particularly to such apparatus for accurately measuring the magnitude and duration of an electrical waveform.

An oscillographic apparatus, either of the type comprising a direct viewing oscilloscope or of the recording type, is useful not only in displaying the waveform of an electrical input signal, but also in measuring the magnitude and duration thereof. Usually, the deflection factor of the oscillographic apparatus is known. For example, it may equal the linear displacement of an electron beam on the face of an oscilloscope for a given voltage magnitude of input signal. A signal voltage may then be determined from the electron beam displacement it produces. Furthermore, the length of a displayed waveform compared to the length of the instrument's time base sweep is indicative of the duration of a given signal waveform. However, the measurement of signal waveforms in the foregoing manner is subject to a number of errors. Displacement of an electron beam or the like in an oscillographic apparatus is usually measured by eye through a graticule or scale on the face or screen of the instrument. Accurate measurement is difficult due to graticule parallax and because of the interpolation necessary when a waveform extends between graticule divisions. Moreover such measurement of the input signal is accomplished after the signal has passed through several stages of amplification and may be inaccurate because the scale factor may be subject to change with time and aging of instrument components.

It is, therefore, an object of the present invention to provide an improved oscillographic apparatus capable of accurate measurement of the magnitude and duration of input waveforms.

It is another object of the present invention to provide an improved oscillographic apparatus including means for accurately measuring an input waveform applied thereto while employing a minimum of added components.

In accordance with an embodiment of the present invention, an oscillographic instrument such as an oscilloscope, for displaying an input waveform, is provided with means for periodically generating a second display of the same waveform, which second display is displaced with respect to the first. For accomplishing the displacement, a calibrated and adjustable electrical value is periodically added to the vertical and/or horizontal deflection system of the oscillographic instrument. The second display is conveniently compared with the first and its dimensional parameters are conveniently measured by adjusting the said calibrated electrical value. For example, with opposite extremities of the input waveform displays juxtaposed in substantial registry, the magnitude and/or duration of the waveform or a segment thereof can be directly determined from the calibrated electrical value.

In accordance with a preferred embodiment of the present invention, calibrated adjustable voltages are added to the respective horizontal or vertical deflection systems coincident with occurrence of selected repetitions of the input waveform. A trigger signal, derived from the input waveform and ordinarily employed for initiating successive sweeps in the oscillographic apparatus, is also used to trigger a step wave generator acting to add calibrated adjustable voltages to the horizontal and vertical deflection systems.

The subject matter which I regard as my invention is particularly pointed out and distinctly claimed at the conclusion of this specification. The invention, however, both as to organization and method of operation together with further advantages and objects thereof, may best be understood by reference to the following description taken in connection with the accompanying drawings in which:

FIG. 1 is a schematic diagram of a calibrated oscillographic instrument in accordance with the present invention, FIG. 2 is a chart of waveforms illustrating the operation of the FIG. 1 circuit, and FIG. 3 is a chart of waveforms illustrating the manner of employment of the FIG. 1 circuit.

Referring to FIG. 1, an input signal in the form of a recurring waveform is applied to input terminal 10 where it is amplified in preamplifier 12. The input signal is then delayed slightly in delay means 13 to allow for the generation of a horizontal sweep coincident with subsequent presentation of the signal. After amplification and delay, the signal is applied to an adder 14, which may take the form of a resistive adding network, an operational amplifier, differential amplifier or the like. Adder 14 receives one input from preamplifier 12, and another input 15 is added thereto, the latter being derived from gate 16. Vertical amplifier 18 in the oscillographic instrument receives the output of adder 14 and applies an amplified version thereof to the vertical deflection plates 20 and 22 of a direct viewing cathode ray tube 23. The waveform or deflection signal applied to vertical deflection plates 20 and 22 causes corresponding instantaneous positioning of the electron beam in the cathode ray tube 23. Vertical amplifier 18 as well as deflection plates 20 and 22 comprises a substantial portion of the vertical deflection system in the oscillographic instrument for determining the amplitude of a display in accordance with the instantaneous amplitude of the input signal waveform.

An output of preamplifier 12 is also applied to sweep trigger circuit 24 in the oscillographic instrument's horizontal deflection system. The sweep trigger circuit is sensitive to the level and slope of the input waveform and at a predetermined level and slope, the sweep trigger circuit provides a sharp output pulse. If the sweep trigger circuit is set to a voltage level and slope recurring on the input waveform, a sweep trigger output is produced for each repetition thereof which may be used to define the waveform for display purposes.

In FIG. 2(a) an input waveform is illustrated at 32 and the sweep trigger circuit may be adjusted to derive triggering from the point 34 thereon, by way of example. The sweep trigger circuit 24 drives a sweep gate multivibrator 26 the function of which is the initiation of horizontal sweep for providing the time base in the oscillographic instrument. When the operation of the sweep gate multivibrator 26 is initiated by means of sweep trigger circuit 24, sweep gate multivibrator 26 supplies an output gate enabling the operation of sweep generator 28 for producing a linear ramp deflection signal having a duration equalling the period of operation of sweep gate multivibrator 26. The resulting ramp waveform is illustrated at 30 in FIG. 2(b), in its relation to the input waveform 32 shown in FIG. 2(a), after the input waveform has been delayed in delay means 13 so as to insure substantial coincidence between ramp 30 and input waveform 32.

The output of sweep generator 28 is applied to horizontal amplifier 36 through adder 38. Adder 38, which also receives an input 40 from gate 42, may comprise a resistance network, operational amplifier, differential amplifier, or the like. The horizontal amplifier 36 drives horizontal cathode ray tube deflection plates 44 and 46 whereby the cathode ray tube's electron beam is caused to scan in a horizontal direction for production of the time dimension for the waveform as displayed. The resulting display of the waveform, having an instantaneous amplitude governed by the signal on vertical deflection plates 20 and 22 and a duration governed by the horizontal sweep, will be called the normal or first display of the input waveform.

According to the present invention, an additional or second display of the input waveform is also provided on the screen of the cathode ray tube. The additional display is generated by means of periodically adding a calibration voltage to the vertical and/or horizontal deflection signals. If such a calibrated voltage is added in both deflection systems, such addition is performed at the same time such that the additional display is displaced both horizontally and vertically by predetermined amounts. The displacement is governed through accurate adjustment of preselected calibration voltages.

Returning to FIG. 1, a vertical calibration voltage is adjustably provided at the tap 48 of a potentiometer 50 connected between a source of positive voltage and ground. Tap 48 provides an input to gate 16 and gate 16 operates under the control of a step wave generator comprising gate control multivibrator 52 to cause the addition of the voltage at tap 48 as an input to adder 14 when gate control multivibrator 52 is in the "on" position, In the "on" position, control multivibrator 52 produces a step wave, e.g., a square wave for enabling the gate 16. Similarly, an adjustable horizontal calibrated voltage is obtained from tap 54 of potentiometer 56 disposed between a source of positive voltage and ground. The voltage at tap 54 is applied as an input 40 to adder 38 when gate 42 is operated by means of gate control multivibrator 52, i.e., when the latter is in the "on" position. Both gates 16 and 42 are operative at the same time under the control of gate control multivibrator 52 to apply the respective vertical and horizontal calibrated voltages to the vertical and horizontal deflection systems.

The magnitude of each such calibrated voltage is accurately determined and indicated by the positioning of the taps 48 and 54 on potentiometers 50 and 56. These potentiometers are so calibrated that the operator of the oscillographic instrument may accurately predetermine the magnitude of such voltage from the front control panel of the instrument. The addition of the calibrated voltages in the deflection systems causes an instantaneous displacement in deflection by a predetermined amount causing the production of a second display displaced with respect to the first by such amount.

The gate control multivibrator 52 is provided an input either from a chopper source 58 or a pulse signal from a divider 60 depending upon the position of switch 62. Under the control of chopper source 58, gate control multivibrator 52 periodically changes from one state to another at an arbitrary rate determined by chopper source 58. With the gate control multivibrator 52 in the "off" position, both gates 16 and 42 are "off" and no calibrated voltages are added to either the vertical or horizontal deflection systems. When chopper source 58 intermittently turns gate control multivibrator 52 "on," both gates 16 and 42 add the respective calibrated voltages to the vertical and horizontal deflection systems whereby the second display of the input waveform takes place. This second display occurs only when gate control multivibrator 52 is "on," but due to persistence of vision and because of the phosphors employed in the cathode ray tube screen, both displays appear to occur at the same time, displaced from one another to an extent determined by the values of the respective calibrated voltages being added.

Although gate control multivibrator 52 may be operated from chopper source 58, switch 62 is preferably thrown in such position that the input to gate control multivibrator 52 is provided from divider 60. Divider 60 is driven by sweep gate multivibrator 26 whereby the operation of gate control multivibrator 52 is synchronized with successive recurrences of the input waveform. Divider 60 is a count-down circuit providing an input to gate control multivibrator 52 at a submultiple of the frequency of sweep gate multivibrator 26. For instance, divider 60 triggers the state of gate control multivibrator 52 so that it will be in the "on" state for every other sweep-enabling-output of sweep gate multivibrator 26. Under these conditions, a second display of the input waveform is produced for every other recurrence of the input waveform.

Operation in this mode is illustrated in the FIG. 2 waveform chart wherein (c) represents the output of gate control multivibrator 52. The gate control multivibrator is "off" during the first and third repetitions of input waveform 32 and "on" during the second and fourth repetitions thereof illustrated. During the first and third repetitions of input waveform 32, no calibrated voltages are added to the deflection systems and the waveform 32 will appear in its normal position on the cathode ray tube screen. During the second and fourth repetitions of the input waveform 32, the predetermined calibrated voltages are added to both the horizontal and vertical deflection system. During the second and fourth repetitions of the input waveform, the said waveform as applied to the vertical deflection plates 20 and 22 will have a relative magnitude as indicated at 32a in FIG. 2(d), having a vertical calibrated voltage indicated at 62 added thereto. Also during the second and fourth periods of operation, the horizontal deflection signal will have a magnitude as indicated at 30a in FIG. 2(b) because of the addition of the horizontal calibrated voltage. As a result, a second display of the input waveform 32 will occur on the cathode ray tube screen, upward and to the right of the first display. In summary then, during the first and third repetitions of the input waveform the normal or first display occurs in its normal position on the cathode ray tube screen. During the second and fourth repetitions, a second display is produced, which second display is displaced from the first display. The amount of displacement is accurately determined by the horizontal and vertical calibrated voltages.

Utilization of the circuit according to the present invention is illustrated in the FIG. 3 waveform chart. In this chart, (a) illustrates a first display 64, of an input signal, comprising a sine wave having a crest point illustrated at B and a trough point at A. In FIG. 3(b) the first display 64 is again illustrated in the same position, but now a second display 66 is also indicated. This second display is of the same sine wave input waveform, but is displaced upwards and to the right. The displacement of the second display is secured through positioning by means of adjustment of taps 48 and 54 of calibrated voltage potentiometers 50 and 56, which provide the added calibrated voltages. The voltages are adjusted with the potentiometers such that waveform display 66 is juxtaposed with respect to waveform display 64, e.g., with trough A of waveform 66 coincident with crest B of waveform 64. It is appreciated that such positioning can be performed quite accurately by visual observation. A coincidence between points A and B can be obtained visually to within one-third of a tracewidth. Now, the magnitude difference between crest and trough of the input waveform is equal to the added calibrated voltage and may be read directly from the control of calibrated potentiometer 50, that is from the position of tap 48. Furthermore, the position of tap 54 of calibrated potentiometer 56 is indicative of the horizontal deflection corresponding to a half cycle of the input sine wave.

The preferred method of measuring the period of an input wave is indicated in FIG. 3(c). Here a first display of an input sine wave is illustrated at 64 and a second display is illustrated in dashed lines at 68. The second display 68 has no vertical displacement with respect to the first. That is the tap 48 on vertical calibrated potentiometer 50 is set to zero. The tap 54 on horizontal calibrated potentiometer 56 is advanced until waveform display 68 has moved to the right by one full cycle, coinciding with the next cycle of display 64. The voltage advance on potentiometer 56 is then a measure of the period of the input waveform.

It is appreciated that the potentiometers 50 and 56 may be initially calibrated using known standard input waveforms. Potentiometer 56 can be calibrated in fractions of a second while potentiometer 50 is calibrated in volts of magnitude.

The measurement secured in employing the present invention is, of course, not restricted to sine waves, but may be applied to various other types of waveforms. Portions of a second or movable display of any waveform may be displaced with respect to a first display of the waveform such that dimensional parameters of the waveform correspond to the displacement between displays. Either horizontal or vertical displacement alone may be provided by merely positioning the potentiometer representing the undesired displacement at the zero voltage point.

Accurate voltage and time measurements are secured in accordance with the present invention due to the accuracy with which first and second traces of a given waveform may be juxtaposed. The measurement achieved is much more accurate than conventional measurement employing graticule markings and requiring attendant calculation according to the deflection factor of the instrument. With the present invention no interpolation is required between graticule divisions and no errors occur which are attributable to graticule parallax. Moreover, since the calibration voltage is compared with the signal at an early stage of amplification in the oscillographic instrument, measurement is more accurate than it would be after the gain of several further stages is added.

Although according to the specific embodiment a calibrated voltage is periodically added to the input waveform in order to produce an aforementioned second display, it is appreciated that another electrical value may be similarly added to the input waveform dependent upon the electrical value by which the input waveform is represented. For example, if the input waveform is represented as a current, then a calibration current will be added thereto.

I claim:
1. An oscillographic instrument providing a first display of a recurrent electrical input waveform, said instrument comprising
   vertical deflection means generating a vertical deflection signal in accordance with the instantaneous amplitude of said input waveform for determining the amplitude of said first display,
   horizontal deflection means generating a horizontal deflection signal for providing a time base sweep,
   electrical means for causing intermittent displacement in the deflection produced by both of said deflection means to provide a second and adjacent display of said waveform,
   means for providing electrical values in the said electrical means, said electrical values being a measure of said displacement and dimensional parameters of said waveform corresponding to said displacement, and
   means for indicating said electrical values.

2. In an oscillographic instrument providing a first display of a recurrent electrical input waveform, said instrument including vertical deflection means generating a vertical deflection signal in accordance with the instantaneous amplitude of said input waveform for determining the amplitude of said first display, said instrument also including horizontal deflection means generating a horizontal deflection signal for providing a time base sweep, the improvement comprising.
   means for providing a preselected calibrated electrical value and means for adjusting said electrical value, and
   means for periodically adding said calibrated electrical value to the horizontal deflection signal in said oscillographic instrument causing substantially instantaneous horizontal displacement in the deflection produced by a said deflection means to provide a second and adjacent display of said waveform which is positionable with respect to the first display in response to adjustment of said electrical value, with said electrical valve being a measure of the time duration of a portion of said waveform with at least portions of said first and second displays of said waveform in substantial juxtaposition.

3. The oscillographic instrument according to claim 2 wherein a calibrated adjustable electrical value is also added to the vertical deflection signal such that both the magnitude and duration of said waveform can be measured when said displays of said waveform are in substantial juxtaposition, and such that added dimensional movement of said waveform is provided for convenient juxtapositioning of selectable portions of the first and second displays of said waveform.

4. An oscillographic instrument for displaying a recurrent electrical waveform and providing a first display thereof, said instrument having vertical deflection means for determining the amplitude of the display in accordance with the instantaneous amplitude of said input waveform and having horizontal deflection signal means for providing a time base sweep, said instrument comprising
   means for applying said input waveform to said vertical deflection means,
   means for supplying a first adjustable calibrated voltage and means for supplying a second adjustable calibrated voltage,
   means for repetitively generating a step wave,
   first adder means for adding said first adjustable calibrated voltage to said input waveform ae said input waveform is supplied to said vertical deflection means, at predetermined times governed by repetitive generations of said step wave, and
   second adder means for adding said second adjustable calibrated voltage to said horizontal deflection signal means also at said predetermined times governed by repetitive generation of said step wave,
   said first and second adder means thereby producing a second display of said input waveform, said second display being shifted vertically and horizontally by calibrated amounts proportioned to said first and second calibrated voltages so that the magnitude and duration of said input waveform may be determined through comparative positioning of said second display with respect to the first by adjustment of said calibrated voltages.

5. The oscillographic instrument according to claim 4 including means for deriving recurring triggering signals from portions of said input waveform for initiating the horizontal deflection signal within the said horizontal deflection signal means providing said time base sweep, and
   means responsive to selected ones of said triggering signals for initiating each repetitive operation of said means for repetitively generating a step wave.

6. The oscillographic instrument according to claim 5 wherein said horizontal deflection signal means includes a horizontal sweep gating multivibrator producing signals for initiating and maintaining horizontal deflection in said horizontal deflection means in response to said triggering signals,
   wherein said first and second adder means each includes a gate for receiving said first and second adjustable calibrated voltages respectively for adding of the same, and
   wherein said means for repetitively generating a step wave comprises a gate control multivibrator for enabling said gates, said gate control multivibrator being switched from a first stable state to a gate enabling state under the control of selected signals produced by said sweep gating multivibrator.

7. The instrument according to claim 1 wherein said electrical values comprise calibrated horizontal and vertical addition voltages added to horizontal and vertical deflection signals applied to said horizontal and vertical deflection means respectively.

8. The instrument according to claim 2 wherein said calibrated electrical value is a calibrated voltage added to the horizontal deflection signal.

References Cited

UNITED STATES PATENTS

| | | | |
|---|---|---|---|
| 2,293,135 | 8/1942 | Hallmark | 324—121 |
| 2,539,971 | 1/1951 | Potjer | 324—121 |
| 2,548,276 | 4/1951 | Weisbecker | 324—121 |
| 2,563,395 | 8/1951 | Carpentier | 324—121 |
| 2,936,418 | 5/1960 | Young | 324—121 |
| 3,277,372 | 10/1966 | Hegeman | 324—121 |

FOREIGN PATENTS 813,967  5/1959  Great Britain.

RUDOLPH V. ROLINEC, *Primary Examiner.*

ERNEST F. KARLSEN, *Assistant Examiner.*

U.S. Cl. X.R.

324—77, 88

PO-1050
(5/69)

UNITED STATES PATENT OFFICE
CERTIFICATE OF CORRECTION

Patent No. 3,449,671      Dated June 10, 1969

Inventor(s) GORDON D. LONG

It is certified that error appears in the above-identified patent and that said Letters Patent are hereby corrected as shown below:

Column 3, line 42, the comma after "tion" should be a period -- . --

Column 6, line 12, delete the period "."

Column 6, line 24, "valve" should be -- value --

Column 6, line 51, "ae" should be -- as --

SIGNED AND
SEALED
MAR 3 1 1970

(SEAL)
Attest:

Edward M. Fletcher, Jr.
Attesting Officer

WILLIAM E. SCHUYLER, JR.
Commissioner of Patents